Jan. 20, 1970   H. I. WAXMAN   3,490,138
TANK WITH METALLIC BLADDER
Original Filed Aug. 29, 1966   4 Sheets-Sheet 1
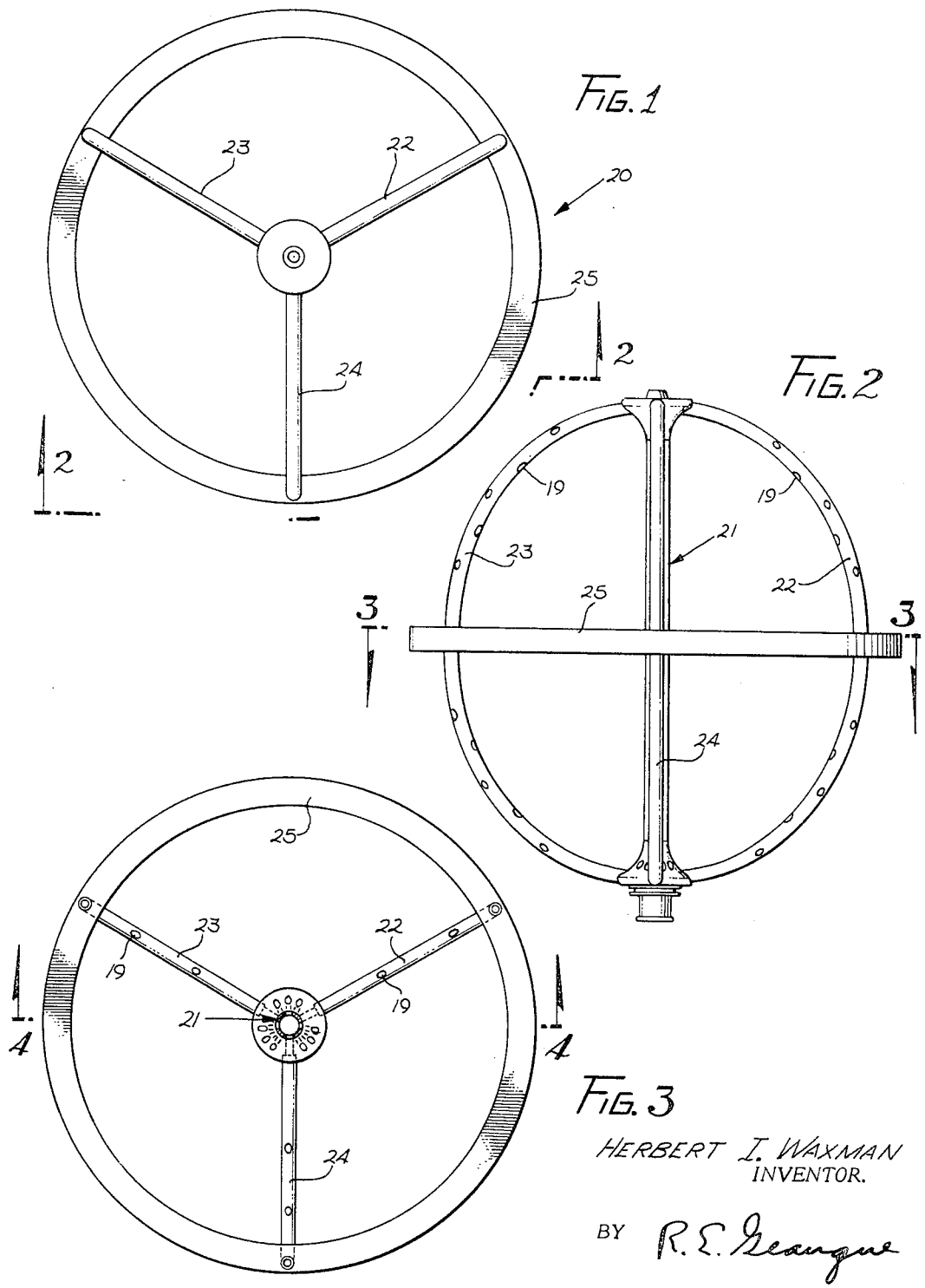
HERBERT I. WAXMAN
INVENTOR.
BY R. E. Geauque
ATTORNEY

HERBERT I. WAXMAN
INVENTOR.

BY R. E. Geangue
ATTORNEY

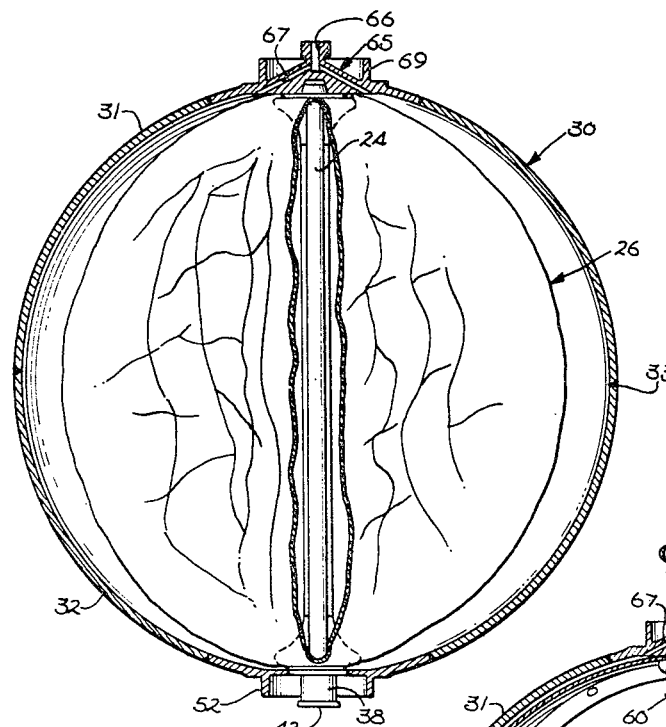
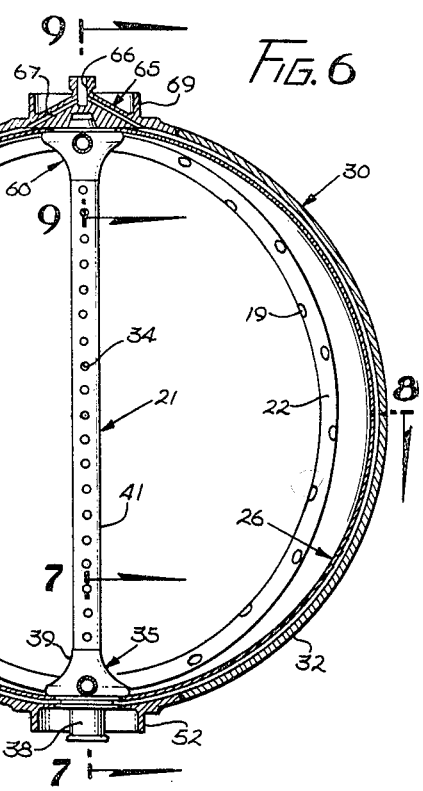
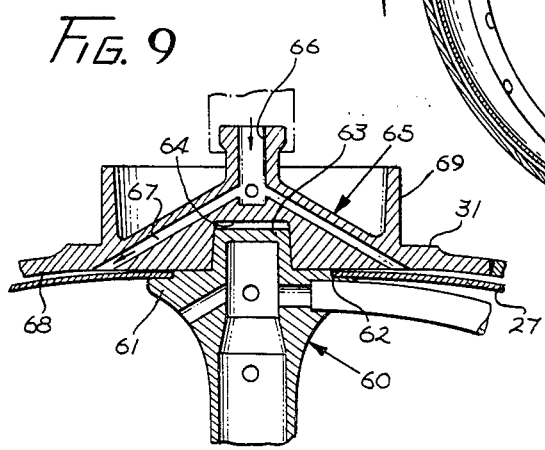

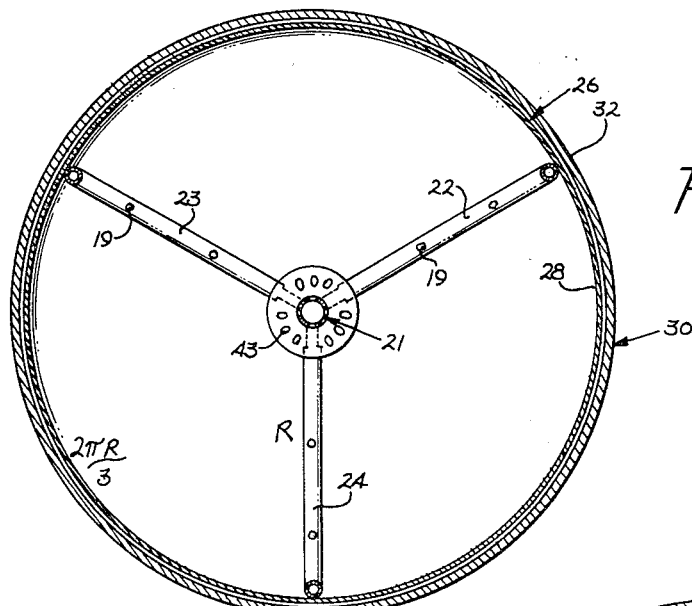
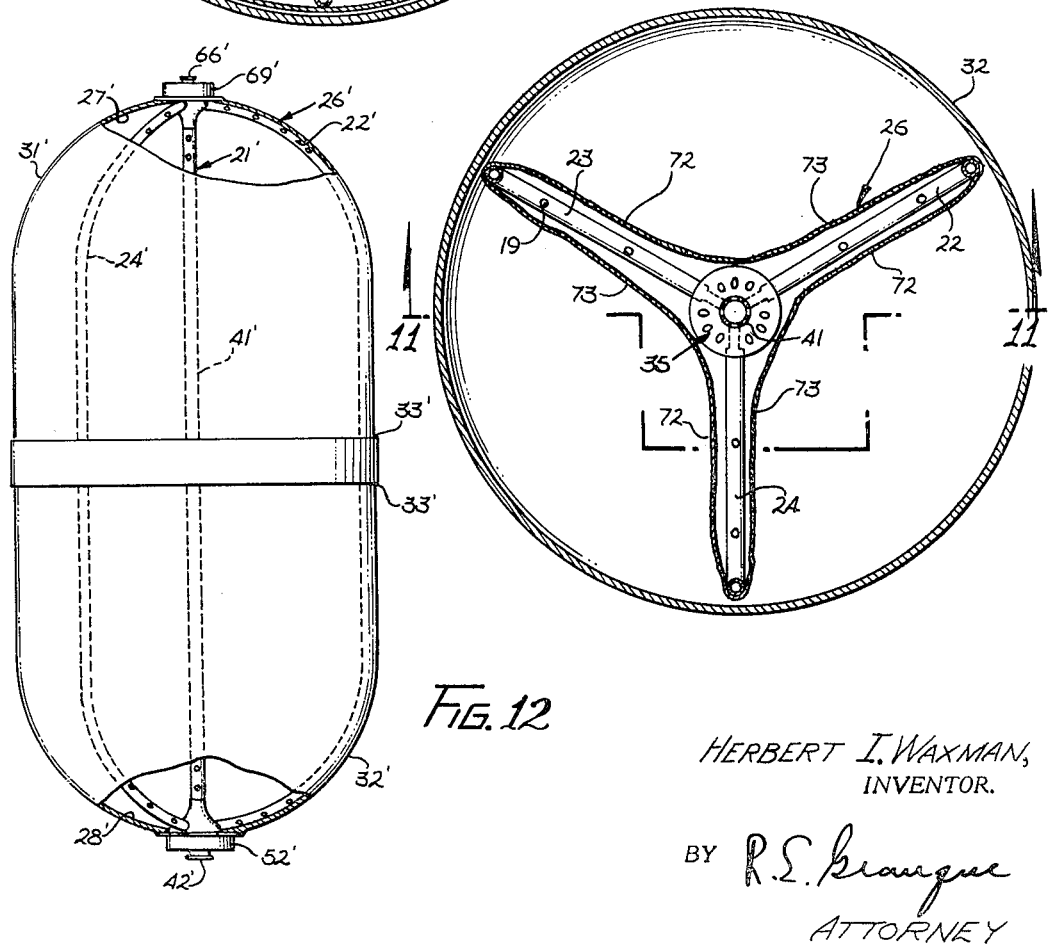

United States Patent Office 3,490,138
Patented Jan. 20, 1970

3,490,138
TANK WITH METALLIC BLADDER
Herbert I. Waxman, Northridge, Calif., assignor to The Marquardt Corporation, Van Nuys, Calif., a corporation of California
Original application Aug. 29, 1966, Ser. No. 575,676, now Patent No. 3,404,813, dated Oct. 8, 1968. Divided and this application June 14, 1968, Ser. No. 737,230
Int. Cl. B23k 5/22
U.S. Cl. 29—471.1                    2 Claims

ABSTRACT OF THE DISCLOSURE

The method of constructing a tank with metallic bladder comprises attaching a back-up ring intermediate the ends of a plurality of spaced ribs and attaching the ribs to the opposite ends of a standpipe. Thereafter, sections of a bladder are placed over the ribs and into edge abutment adjacent the back-up ring. The sections are welded together at the debutting edge while the weld is chilled by the back-up ring, and the back-up ring is then removed by a suitable process, such as etching.

---

This application is a division of U.S. application Ser. No. 575,676, filed Aug. 29, 1966, now Patent No. 3,404,813.

The invention relates to a tank with a metallic bladder and method of constructing same and, more particularly, to a tank and bladder assembly in which a liquid can be enclosed for long periods of time without deterioration of the bladder or tank.

In some cases, it is desirable to fill a tank with liquid some time prior to the installation of the tank at its point of use. This is particularly desirable for propellant and oxidant tanks used in missiles and aircraft. After installation, it is important to have a simple means by which the tank can be substantially emptied if this cannot be accomplished by gravity flow. Rubber and plastic liners have been utilized in tanks and the application of pressure to the exterior of the liner forces the liquid substance out of the tank. However, since such liner materials are deteriorated by corrosive liquid substances, such as corrosive propellants, the liners cannot be utilized to store such substances for any substantial period of time.

In the present invention, a very thin metallic bladder of a corrosion resistant steel is surrounded by a steel tank which takes the main structural load. The frame for the bladder comprises a plurality of ribs which are located on perimetrical lines of the tank and in different axial planes space around a central standpipe. The central standpipe runs the full length of the bladder and the ends of the ribs are attached at opposite ends of the standpipe. When fluid pressure is introduced between the bladder and the tank, the bladder is collapsed about the ribs and the liquid is forced out through the standpipe. Preferably, three ribs are spaced on perimetrical lines 120° apart about the central standpipe so that the bladder surface between the ribs permits the bladder surface to collapse substantially into the axial planes of the ribs.

An aluminum alloy ring is located at the longitudinal center of the standpipe and is supported by all of the ribs. The bladder is formed in two sections and the sections are placed over the frame from opposite ends and into edge abutment opposite the aluminum ring. Thereafter, the halves are welded together at their edges and the aluminum ring is etched out of the interior of the bladder. Thus, the aluminum ring provides a fixture for positioning the bladder sections for the butt welding and for chilling the sections at the weld.

The outer tank has the same shape as the bladder and is formed of two sections which are placed around the bladder and welded together. The tank and bladder can be formed in a variety of shapes, such as spherical or cylindrical, and can be constructed from a variety of corrosion resistant materials.

It is therefore an object of the present invention to provide a tank with metallic bladder in which corrosive liquid substances can be totally enclosed and stored for long periods of time.

Another object of the invention is to provide a method of constructing a tank with metallic bladder comprising the steps of forming the bladder around an internal frame having a removable, back-up ring centrally located to serve as a support and chilling member during the welding of the bladder sections and thereafter removing said ring.

These and other objects of the invention not specifically set forth above will become readily apparent from the accompanying description and drawings in which:

FIGURE 1 is an end elevational view of the bladder frame showing the spaced ribs and the back-up ring;

FIGURE 2 is a side elevational view along line 2—2 of FIGURE 1 showing the central standpipe to which the ribs are connected;

FIGURE 3 is a horizontal section along line 3—3 of FIGURE 2;

FIGURE 6 is a vertical section similar to FIGURE 4 through the tank showing the bladder supported by the internal frame and surrounded by the tank;

FIGURE 8 is a horizontal section along line 8—8 of FIGURE 6;

FIGURE 9 is a vertical section along line 9—9 of FIGURE 6 showing the passages through which the pressurized fluid is introduced to the space between the bladder and the tank;

FIGURE 10 is a section similar to FIGURE 8 showing the bladder collapsed between the ribs;

FIGURE 11 is a vertical section along line 11—11 of FIGURE 10 showing the collapsed bladder; and FIGURE 12 is a sectional view of a modified tank having a substantially cylindrical shape.

Figure 5:
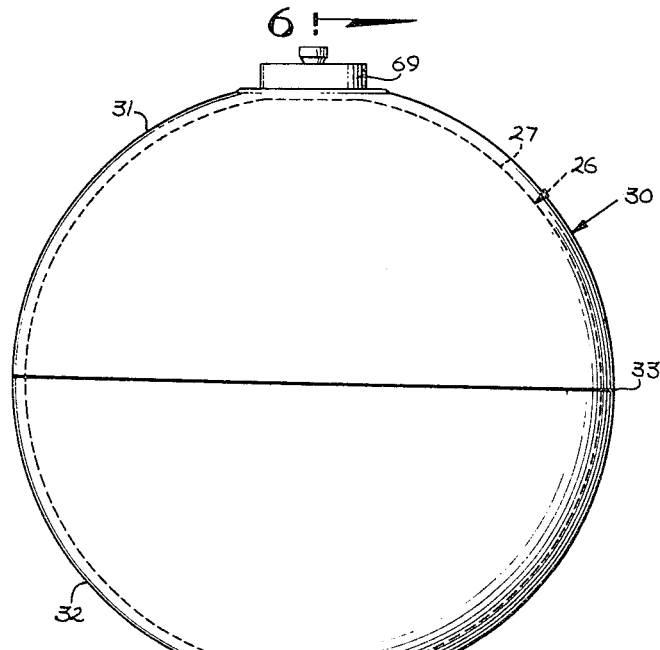
FIGURE 5 is a side elevational view of the tank in which the bladder is located.
Figure 4:
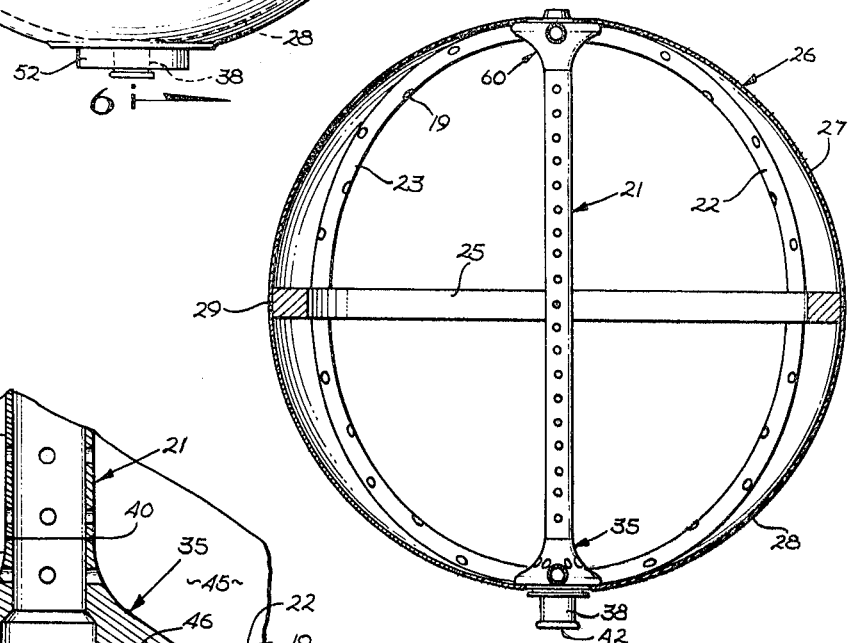
FIGURE 4 is a sectional view along line 4—4 of FIGURE 3 showing the bladder sections welded together opposite the back-up ring.

Referring to FIGURES 1–3, the interior bladder frame assembly 20 comprises a central standpipe 21 and three ribs 22, 23, and 24. Each of the ribs consist of a semicircular tube having openings 19 along its length and having its ends rigidly connected to opposite ends of the standpipe 21. A back-up ring 25 is located at the central, transverse plane of the standpipe 21 and has openings adjacent its outer periphery for receiving the three ribs 22–24. Bladder 26 is fabricated of two sections 27 and 28, each of which is a half-spherical shell, and when the shells are placed over the ribs, they meet at the line 29 which is located opposite the ring 25. During the welding operation, the ring serves as an assembly fixture for holding the shells in place and also serves to chill the material at the weld so that a suitable butt weld can be accomplished between the edges at line 29. The ring 25 is preferably fabricated from an aluminum alloy which can be etched out with a caustic solution after the weld is completed. The caustic etching solution can be inserted through the standpipe into the bladder for this purpose and the bladder is cleaned inside and out after the etching is completed. After completion of the bladder assembly illustrated in FIGURE 4 and the removal of the ring 25, the tank 30 is placed around the bladder 26 and consists of two sections 31 and 32 which are butt welded at the line 33. The tank material is considerably thicker than the bladder material since the tank resists the internal and external forces and protects the bladder.

Figure 7:
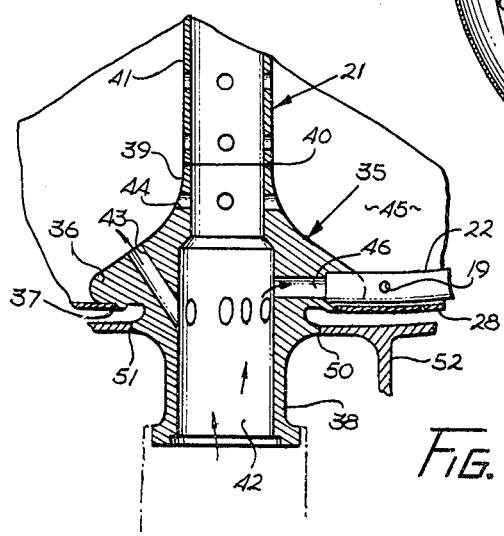
FIGURE 7 is a vertical section along line 7—7 of FIGURE 6 showing the liquid conduit connected with the bladder.

Referring to FIGURE 7, one end of the standpipe 21 comprises a liquid conduit fitting 35 connecting with the interior of the bladder. A flange 36 on the fitting is welded to the edge of a circular opening 37 in bladder section 28, and end 38 of the fitting projects to the exterior of the bladder. The other end 39 of the fitting is welded at line 40 to the cylindrical portion 41 of the standpipe 21 which contains openings 34. A passage 42 extends through fitting 35 and contains a plurality of angular openings 43 and a plurality of radial openings 44 which lead to the interior space 45 of the bladder. Also, the end of each rib is secured in a radial passage 46 in the fitting. An enlarged flange 50 on end 38 is secured by welding to the edge of opening 51 in the tank section 32 of tank 30. Since both the tank and the bladder are rigidly connected to the fitting 35, no relative movement of these members at this point will result. The tank section 32 carries a mounting flange 52 for rigidly supporting both the tank and the bladder. Fluid to be stored is introduced through the passage 42 and enters the bladder space 45 through the passages 43, 44 and 46. After the bladder is filled, the passage 42 can be closed by any suitable closure means, such as a valve (not shown).

Referring to FIGURE 9, the other end 60 of the standpipe 21 comprises a fitting which has a flange 61 welded to the edge 62 of a circular opening in bladder section 27. Cap end 63 of fitting 60 projects into a cavity 64 in the enlarged portion 65 of the tank section 31. The cavity 64 serves as a guide for the cap 63 so that the bladder can move relative to the tank while maintaining axial alignment with the tank. The enlarged portion 65 contains a passage 66 which connects with a plurality of branch passages 67 leading to the space 68 between the bladder and the tank. Also, the enlarged portion carries a flange 69 which, along with the flange 52, serves to provide a support for the outer tank 30.

After assembly of the complete tank, the tank can be filled with liquid through the liquid conduit 42 and the liquid can be stored in the tank for long periods of time since the metallic bladder will resist any corrosive action of the liquid. Preferably, the bladder and tank are constructed of CRES321 stainless steel alloy to assure long term compatability with the liquid. The thin shell is mained in its spherical configuration since it is supported at three separate locations by the ribs. When it is desired to expel the liquid from the tank, a pressurized fluid is introduced into space 68 through passages 66 and 67. Under the influence of this pressure, the bladder material will collapse inwardly towards the standpipe 21 in order to expel the liquid through the openings 19 in the ribs and openings 34 in the standpipe, all connecting with passage 42 which is opened to empty the bladder. Prior to collapse, the bladder has a 3-lobe configuration with each lobe surface being located between two ribs. When the bladder is collapsed inwardly, each lobe forms sides 72 and 73 lying closely adjacent to the axial plane of adjacent ribs. Therefore, the volume within the bladder is reduced to a very small value.

Referring to FIGURE 8, the arc between a pair of ribs is $2\pi R/3$ and the distance between the standpipe at the lobe surface is designated as R. Thus, sufficient bladder surface is available to expel all the stored liquid since the arc length $2\pi R/3$ of the lobe is virtually equal to its collapsed length, namely 2R. The openings 19 in the ribs assure expulsion from all areas of the bladder and prevent local fluid entrapment so that explusion efficiencies of over 98% can be obtained in a single cycle operation without developing holes or tears in the bladder material. The fully collapsed bladder is illustrated in FIGURES 10 and 11 and it is apparent that the bladder will bend inwardly to the collapsible position without substantial crinkling except in the direction of the longitudinal axis of the standpipe 21. In this axial direction, there is about 30% excess of material as illustrated in FIGURE 11 which pleats very rapidly without any difficulty.

FIGURE 12 illustrates a modified tank which is substantially cylindrical in shape and primed numerals designate parts corresponding to those of the prior embodiment. It is understood that the same standpipe fittings can be utilized although the ribs, bladder and tank have a different shape. The cylindrical configuration has the advantage that there is much less material along the longitudinal axis of the standpipe which must be pleated.

The present invention provides a single cycle expulsion system which operates under a positive external expelling pressure and the thin metallic bladder material is supported by an internal rigid frame which prevents the inward collapse of the bladder in the absence of an expelling pressure. The bladder collapses in the tri-lobe configuration and propellant is expelled through the central standpipe which runs the full length of the pipe. The sections of the bladder and tank can be produced by shear forming or other suitable process which develops high strength in the material permitting the wall thickness to be minimized. Because of the very thin walls of the bladder, only a small differential pressure against the bladder is required to collapse the bladder and only a small amount of pressurized fluid is required since the clearance space 68 is very small. It is understood that the shape of the tank and the number of ribs can be varied and that various means can be utilized for connecting the bladder and tank together and for mounting the tank. Also, various means can be used to conduct the stored liquid and the pressurized fluid. Various other modifications are contemplated by those skilled in the art without departing from the spirit and scope of the invention as hereinafter defined by the appended claims.

What is claimed is:
1. A method of fabricating a tank with metal bladder comprising the steps of:
  attaching a back-up ring intermediate the ends of a plurality of spaced ribs;
  attaching said ribs to the opposite ends of a standpipe;
  placing sections of the bladder over said ribs into edge abutment adjacent said back-up ring;
  welding said sections together while chilling said weld by said back-up ring; and
  removing said back-up ring.
2. The method of defined in claim 1 wherein said back-up ring is removed by etching.

References Cited

UNITED STATES PATENTS

| 2,970,719 | 2/1961 | Brady | 29—491 X |
| 3,097,766 | 7/1963 | Biehl et al. | 222—386.5 X |
| 3,104,526 | 9/1963 | Hirschfeld et al. | 222—386.5 X |

JOHN F. CAMPBELL, Primary Examiner

RONALD J. SHORE, Assistant Examiner

U.S. Cl. X.R.

29—423, 491